US007901751B2

(12) United States Patent
Di Nardo et al.

(10) Patent No.: US 7,901,751 B2
(45) Date of Patent: Mar. 8, 2011

(54) INTERCHANGEABLE SLEEVE FOR EMBOSSING ROLLERS OR THE LIKE, METHOD FOR THE PRODUCTION THEREOF, AND ROLLER COMPRISING SAID SLEEVE

(75) Inventors: Valter Di Nardo, Lucca (IT); Fabrizio Lorenzi, Lucca (IT); Mauro Gelli, Capannori (IT)

(73) Assignee: Fabio Perini S.p.A., Lucca (IT)

( * ) Notice: Subject to any disclaimer, the term of this patent is extended or adjusted under 35 U.S.C. 154(b) by 981 days.

(21) Appl. No.: 11/664,105

(22) PCT Filed: Sep. 27, 2005

(86) PCT No.: PCT/IT2005/000557

§ 371 (c)(1),
(2), (4) Date: Mar. 29, 2007

(87) PCT Pub. No.: WO2006/035470

PCT Pub. Date: Apr. 6, 2006

(65) Prior Publication Data

US 2008/0115903 A1 May 22, 2008

(30) Foreign Application Priority Data

Sep. 30, 2004 (IT) ................................ FI2004A0202

(51) Int. Cl.
*B25F 5/02* (2006.01)
*F16C 13/00* (2006.01)

(52) U.S. Cl. .............. 428/35.7; 492/38; 492/39; 492/40; 492/49; 492/50; 492/52

(58) Field of Classification Search .................... 492/38, 492/39, 40, 49, 50, 52; 428/35.7
See application file for complete search history.

(56) References Cited

U.S. PATENT DOCUMENTS

| | | | | | |
|---|---|---|---|---|---|
| 1,608,207 | A | * | 11/1926 | Gammeter | 492/47 |
| 2,107,471 | A | * | 2/1938 | Stanley et al. | 492/41 |
| 2,231,738 | A | * | 2/1941 | Shoup | 492/45 |
| 3,451,112 | A | * | 6/1969 | Geiger et al. | 492/52 |
| 3,639,959 | A | * | 2/1972 | Bagley et al. | 492/50 |
| 3,646,651 | A | * | 3/1972 | McGaughey et al. | 492/52 |
| 3,646,652 | A | * | 3/1972 | Heiligenthal et al. | 492/53 |
| 3,807,013 | A | * | 4/1974 | Sukenik | 29/895.32 |
| 4,015,320 | A | * | 4/1977 | Meckel et al. | 492/50 |
| 4,144,813 | A | * | 3/1979 | Julian | 101/382.1 |
| 4,312,444 | A | * | 1/1982 | Mushovic | 198/780 |
| 4,416,201 | A | * | 11/1983 | Kessler | 101/348 |
| 4,866,826 | A | * | 9/1989 | Koide | 29/895.3 |
| 5,091,027 | A | * | 2/1992 | Watanabe | 156/172 |
| 5,097,596 | A | * | 3/1992 | Hoogesteger et al. | 29/895.21 |

(Continued)

FOREIGN PATENT DOCUMENTS

| | | |
|---|---|---|
| DE | 509605 | 10/1930 |

(Continued)

*Primary Examiner* — Rena L Dye
*Assistant Examiner* — Michele Jacobson
(74) *Attorney, Agent, or Firm* — Breiner & Breiner, LLC

(57) ABSTRACT

The interchangeable sleeve comprises: a substantially cylindrical outer surface (105A); a layer of hardened resin (R); a substantially conical inner surface for connection to a conical central core of the roller. The inner surface is formed at least partially of at least one inner component (102) having greater rigidity than said hardened resin. The inner component is constrained to the sleeve by means of said hardened resin.

8 Claims, 4 Drawing Sheets

U.S. PATENT DOCUMENTS

| | | | | |
|---|---|---|---|---|
| 5,216,954 | A * | 6/1993 | Thompson | 101/375 |
| 5,654,100 | A * | 8/1997 | Kobler et al. | 428/390 |
| 5,766,120 | A * | 6/1998 | Schmitz | 492/26 |
| 5,895,344 | A * | 4/1999 | Matsuzawa et al. | 492/54 |
| 6,044,963 | A * | 4/2000 | Lerch et al. | 198/780 |
| 6,048,428 | A * | 4/2000 | Millward et al. | 156/190 |
| 6,171,223 | B1 * | 1/2001 | Koivukunnas et al. | 492/56 |
| 6,470,945 | B1 | 10/2002 | Biagiotti | |
| 6,578,617 | B1 | 6/2003 | Biagiotti | |
| 6,729,466 | B2 * | 5/2004 | Lerch et al. | 198/780 |
| 6,755,928 | B1 | 6/2004 | Biagiotti | |
| 7,357,892 | B2 * | 4/2008 | Betti et al. | 264/262 |
| 2004/0242392 | A1 * | 12/2004 | Betti et al. | 492/28 |
| 2007/0281843 | A1 * | 12/2007 | Matuschczyk | 492/48 |

FOREIGN PATENT DOCUMENTS

| | | | |
|---|---|---|---|
| EP | 0 370 972 | B1 | 11/1992 |
| EP | 0 836 928 | A1 | 4/1998 |
| WO | WO 03/045679 | A1 | 6/2003 |
| WO | WO 03/045680 | A1 | 6/2003 |

* cited by examiner

Fig 5
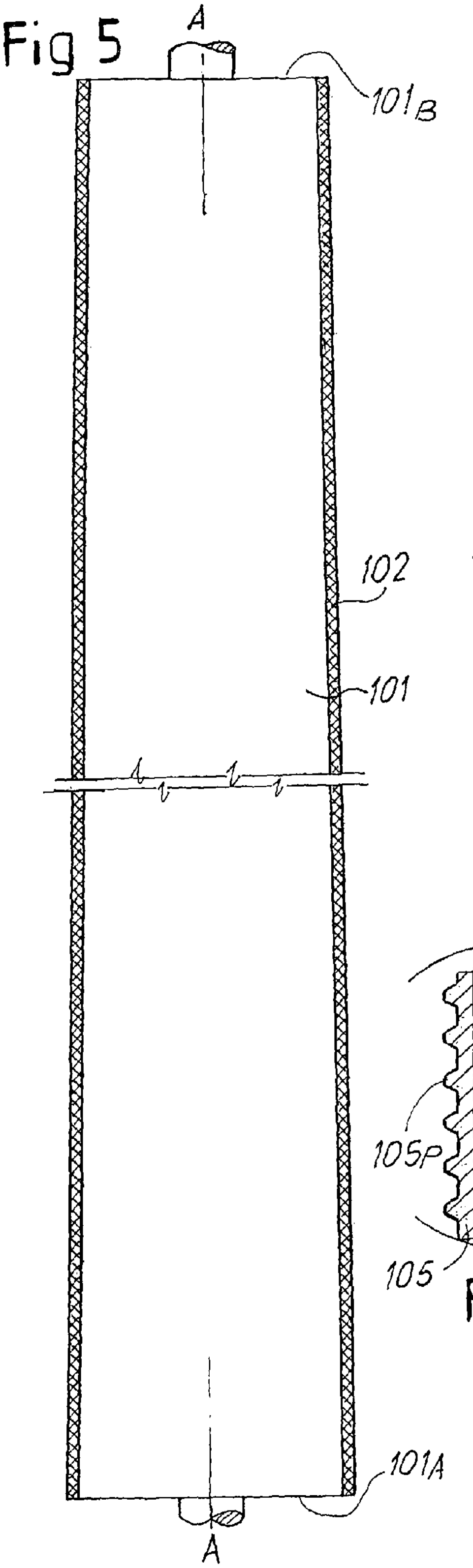
Fig.6
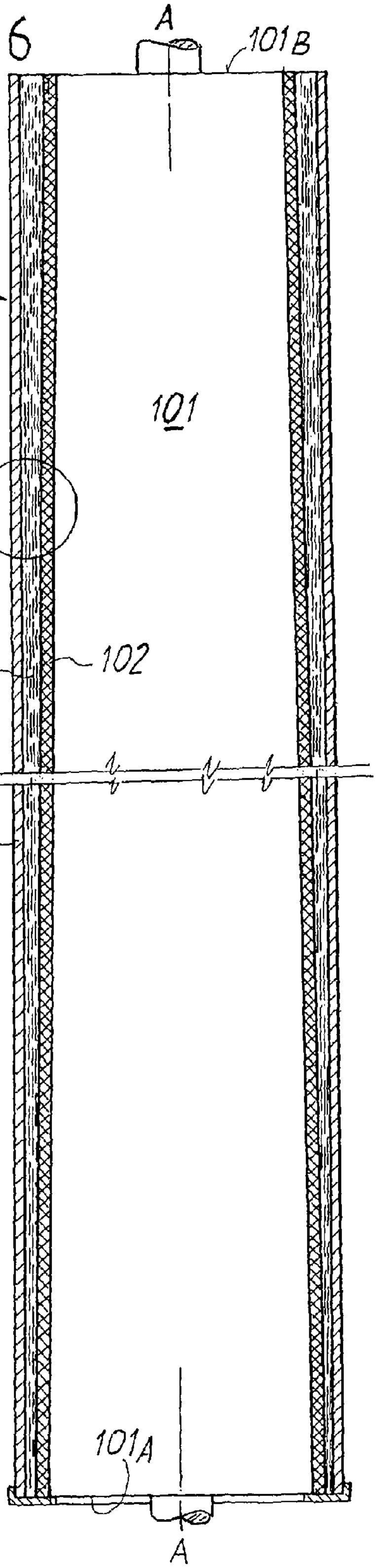
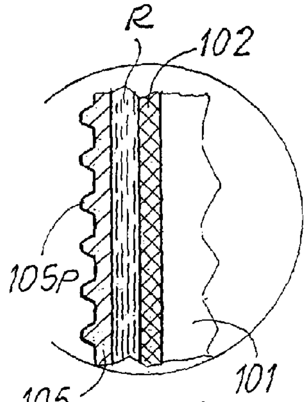
Fig.6A

INTERCHANGEABLE SLEEVE FOR EMBOSSING ROLLERS OR THE LIKE, METHOD FOR THE PRODUCTION THEREOF, AND ROLLER COMPRISING SAID SLEEVE

TECHNICAL FIELD

The present invention relates to improvements to rollers for processing web material, in particular, although not exclusively, embossing rollers for processing paper, in particular tissue paper.

The invention specifically relates to rollers with interchangeable sleeve, i.e. rollers in which the outer processing surface is produced on a sleeve removable from a central core, to allow the use of different distinct sleeves for type of conformation or surface processing on a common axle or core. These rollers are used particularly in the field of tissue paper embossing to allow the converter to obtain products with variable decorative patterns and/or technical/functional characteristics.

PRIOR ART

In the processing of web or sheet materials, for example and in particular tissue paper, an embossing operation is frequently performed, in which the material is fed through a nip between two rollers provided with protrusions and/or protuberances, or one provided with protrusions and the other with a smooth and yielding surface, or yet again between a roller provided with protuberances and one provided with corresponding cavities. Passing through the nip between the two rollers (which may or may not be pressed against each other, depending on the material used and on the structure of the surface of said rollers), the material is deformed permanently with partial breakage of the fibers of which it is composed. Embossing produces protuberances on the material, corresponding in shape to the protuberances on the embossing roller or rollers used.

Embossing is used, above all in the tissue paper converting field, to obtain particular technical-functional effects, such as increased softness, increased thickness, increased absorption capacity, and also to obtain decorative effects. The object of embossing can also be to join two or more plies together, or to prepare one or more plies to receive a glue by means of which two or more plies are then joined by laminating them between two embossing rollers or between one embossing roller and one laminating roller, or in any other appropriate way.

Examples of embossing units in various configurations are described in the U.S. Pat. No. 6,578,617, in the U.S. Pat. No. 6,470,945, in the European patent no. 1.075.387, in the European patent no. 370.972 and in numerous other patents pertaining to the same technological sector.

Recently, the need to customize the product has been increasingly felt, especially in the tissue paper converting field. Various manufacturers wish to customize their product by using specific designs produced by embossing, optionally combined with background embossing, which provides the product with special technical-functional characteristics. Frequently, manufacturers of tissue paper articles wish to offer their customers products characterized by diverse and variable designs.

Engraving of the embossing rollers is an extremely costly operation and therefore these rollers are very expensive. The need to obtain different designs, interchangeable with one another, therefore involves a large investment for the paper converter, who must have a supply of numerous embossing rollers.

In order to reduce the incidence of these costs, embossing systems have been designed in which the embossing roller is composed of a central core and of an interchangeable sleeve. This allows various interchangeable sleeves to be mounted on the same core in order to use various alternative designs.

Embossing rollers composed of a central core and of an interchangeable sleeve have some constructional problems, mainly deriving from the difficulty of adequately clamping the sleeve on the central core, also taking into account the exceptionally high mechanical stress undergone by these components during operation.

A further critical aspect is represented by the need to produce the interchangeable sleeves and the core with surfaces corresponding with each other to guarantee concentricity between the axis of rotation and the outer cylindrical surface of the interchangeable sleeve.

Embodiments of embossing rollers comprising an axle and an interchangeable sleeve with different mechanisms to clamp the sleeve on the axle are described in EP-A-0.836.928, WO-A-03/045679 and WO-A-03/045680. In some of these rollers, the sleeve is provided with a layer of hardened resin, which is poured between a jacket and a central core with the same shape as the central core of the embossing roller (or which is composed by the latter). In this way a sleeve is obtained with a conical inner surface joined perfectly to the conical surface of the core.

OBJECTS AND SUMMARY OF THE INVENTION

According to a first aspect, the object of the invention is to produce an interchangeable sleeve which is connectable with precision to a central core of an embossing roller or other roller for processing a web material and which does not have substantial drawbacks caused by deformations or instable form of the internal surface.

This and other objects and advantages, which shall be clear to those skilled in the art by reading the text hereunder, are in substance obtained with an interchangeable sleeve in particular, although not exclusively, for embossing rollers, comprising:

- a substantially cylindrical outer surface, optionally provided with embossing protuberances or projections formed by an outer jacket;
- a layer of hardened resin; and
- a substantially conical inner surface, for connection to a central core with a conical surface of the roller, which inner surface is formed at least partially of one or more components with greater rigidity than said hardened resin, said at least one component being constrained to said jacket by means of said hardened resin.

According to a possible embodiment, the conical inner surface is formed in part of a plurality of rings aligned axially along said sleeve and each having a conical inner surface, said rings being clamped to said jacket forming the outer surface of the sleeve.

The rings can be made of a metal material, such as and in particular steel.

Preferably, a portion of conical surface formed directly by said hardened resin is provided between consecutive rings, said surface portion being flush with the conical surface of said rings.

Advantageously, according to a preferred embodiment of the invention, the hardened resin can for example be a bi-component resin, poured in liquid state between the outer jacket and the space available between said outer jacket and a central core, and subsequently hardened.

According to a particularly advantageous embodiment of the invention, to obtain optimal clamping between rings and jacket, a volume filled with the hardened resin is provided between said rings and the inner surface of said jacket.

According to a different embodiment of the invention, the component or components with greater rigidity are composed of carbon fiber, for example of a layer of carbon fibers wound around a central forming core and stabilized by a binding resin, to form one or more components composed of a resin reinforced with carbon fibers and in particular with continuous carbon filaments.

Preferably, in this case, a single inner component is provided, having an axial extension substantially the same as the axial extension of the interchangeable sleeve, which forms the entire conical inner surface of the sleeve, and a continuous or discontinuous layer of hardened resin is provided between this component and the outer jacket of the sleeve to clamp the carbon fiber component to the outer jacket.

According to a further aspect, the invention relates to a roller comprising a central core with a conical outer surface and an interchangeable sleeve as defined above. According to a further aspect, the invention also relates to an embossing unit comprising at least one roller of the aforesaid type.

According to yet another aspect, the object of the invention is to provide a method for the production of interchangeable sleeves for rollers for processing a web material, in particular embossing rollers, which are particularly efficient and allow sleeves to be obtained which can be connected with precision to a core forming the central part of the roller.

In substance, this and other objects and advantages, which shall be clear to those skilled in the art from reading the text hereunder, are obtained with a method comprising the steps of:

a. providing a central core with a conical outer surface;
b. applying on said central core at least one substantially rigid component having a conical inner surface complementary to the conical outer surface of said core;
c. arranging a jacket with a substantially cylindrical outer surface around said central core and said at least one substantially rigid component, coaxially to the axis of said core;
d. clamping and, by means of a resin, joining said at least one substantially rigid component and said jacket to form one piece;
e. removing the assembly formed of said at least one substantially rigid component and of said jacket forming one piece from the core.

Advantageously, according to a preferred embodiment of the method according to the invention, rings are placed over the central core, made for example of a sufficiently rigid metal such as steel or the like, with gradually variable dimensions, so that said rings are connected with said central core or axle in positions distributed along the axial extension thereof. The rings and the jacket are then connected together by pouring fluid resin into the base volume between said core and said jacket and solidifying the resin. An optional release agent applied previously to the central core facilitates removal of the assembly forming the sleeve.

According to a different embodiment, a carbon fiber component is produced around the central core, which can advantageously have an axial extension substantially the same as the axial extension of the entire interchangeable sleeve. Once this component has been produced, for example by helically winding carbon filaments impregnated with hardening resin, the outer jacket is placed around the assembly formed of the aforesaid component and of the central core and a hardening resin is poured between the rigid inner component and the outer jacket to join the inner component to the outer jacket.

Joining of the inner component thus obtained to the outer jacket using poured resin can also take place after the dried inner component has been removed from the central core for winding the carbon fiber, remounting the inner component on a spindle with combined conical surface. This can be useful, for example, to replace the central core on which winding was implemented with another less expensive core.

The invention has noteworthy advantages with respect to prior art to produce interchangeable sleeves for embossing cylinders or rollers or the like. In fact, the inner surface of the finished sleeve is composed at least in part of the conical surfaces of the rings distributed along the axial extension of the sleeve, or of a continuous axial component.

When rings spaced along the axis of the sleeve are provided, these rings form a discontinuous surface made of steel or another hard material forming the rings. Consequently, the sleeve is connected to the surface of the core of the roller by means of a conical connection surface which is at least partly composed of a material with high resistance to wear and which is not subject to permanent deformations. This guarantees a high connection precision and a much longer useful life of the sleeve than those of sleeves in which the surface for connection to the core of the roller is made entirely of synthetic resin, or is formed solely of thin metal rings fixed more or less precariously to the inner surface of the jacket forming the main body of the sleeve.

When a continuous axial component is used, this forms a substantially rigid surface, as a result of the rigidity of the materials used, typically carbon, which allows similar advantages to be obtained.

BRIEF DESCRIPTION OF THE DRAWINGS

The invention will now be better understood by following the description and accompanying drawings, which show a non-limiting practical embodiment of the invention. In particular:

FIGS. 5 and 6 show two phases of a procedure for implementation according to a different embodiment of the invention; and FIG. 6A shows an schematic enlargement of the detail $VI_A$ in FIG. 6.

DETAILED DESCRIPTION OF PREFERRED EMBODIMENTS OF THE INVENTION

Figure 1:
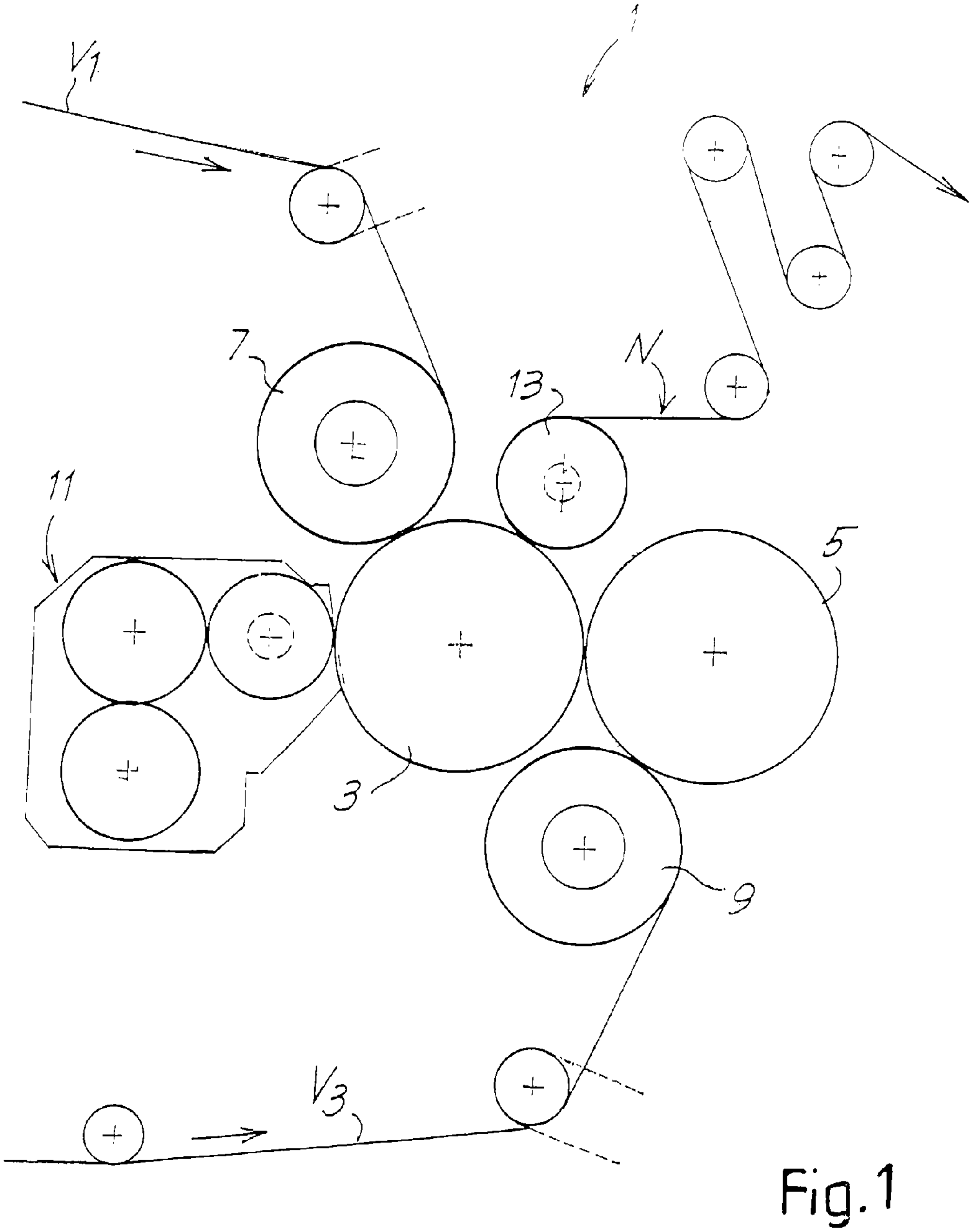
FIG. 1 shows a diagram of a first type of embossing unit in which an interchangeable sleeve according to the invention can be applied.
Figure 2:
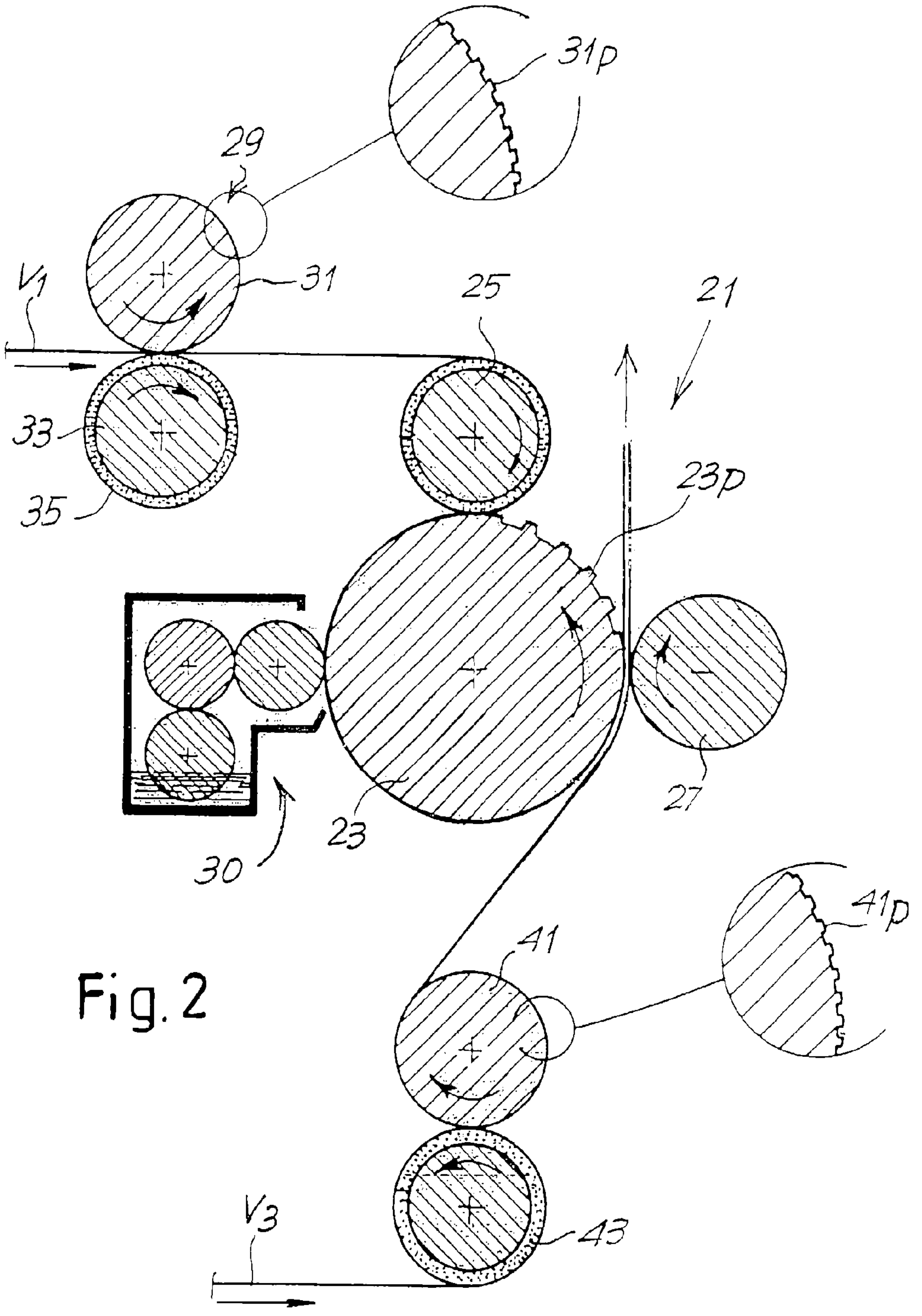
FIG. 2 shows a diagram of a second type of embossing unit in which the invention can be applied.

FIGS. 1 and 2 schematically show two embossing-laminating units of different configuration in which rollers produced with a central axle or core and an interchangeable sleeve according to the invention can be used. It must be understood that the embossing-laminating units in FIGS. 1 and 2 are only two examples of possible machinery in which the invention can be advantageously used.

With reference to FIG. 1, the embossing-laminating unit, indicated as a whole with 1, comprises a first embossing roller 3 and a second embossing roller 5 with parallel axes forming a nip therebetween. The embossing rollers 3 and 5, which are provided on the surfaces thereof with protuberances obtained by means of engraving using any available technique, each cooperate with a corresponding pressure roller 7 and 9. The pressure rollers 7 and 9 are coated in a yielding material, such as plastic or rubber, and have a smooth outer surface.

Two plies V1 and V3 of web material, such as tissue paper, are fed into the nips between the rollers 3 and 7 and between the rollers 5 and 9 respectively. In this way the two plies V1 and V3 are embossed as a result of the pressure exerted by the embossing rollers 3 and 5 against the yielding surfaces of the rollers 7 and 9. A glue is applied to the protuberances produced on the ply V1 by the protuberances of the embossing roller 3, by means of a gluing unit 11, of known type and represented schematically in the figure. In the nip between the embossing rollers 3 and 5 the two plies are laminated together by pressing them at the level of the corresponding protrusions or protuberances of the rollers 3 and 5. Alternatively, the two rollers 3 and 5 can be disposed with their protuberances staggered, i.e. with the protuberances of the roller 5 placed opposite the empty spaces between the protuberances of the roller 3, or distanced from one another and in any case without reciprocal contact between the protrusions. In this case the two plies V1 and V3 are not laminated between the rollers 3 and 5, but between the roller 3 and a supplementary laminating roller 13.

Irrespective of the embossing and laminating technique used, a multi-ply web material N, composed of two plies V1 and V3 embossed and glued to each other, is obtained at the outlet of the embossing unit. Each ply can in turn be composed of several layers.

In the embodiment in FIG. 2, the embossing-laminating unit, indicated here with 21, comprises a principal embossing roller 23 cooperating with a pressure roller 25 coated in a yielding material, such as rubber and having a substantially smooth surface. A laminating roller 27 with a smooth surface, rigid or yielding, although advantageously with greater rigidity than the cylindrical surface of the pressure roller 25, also cooperates with the embossing roller 23 provided with protrusions 23P.

A first ply of web material V1 is fed around the pressure roller 25 through the nip formed by this roller and by the embossing roller 23. Before passing through this nip the web material V1 passes through a supplementary embossing unit, indicated as a whole with 29, and composed of an embossing cylinder or roller 31 provided with protuberances or protrusions 31P and cooperating with a pressure roller 33 coated in rubber or another yielding material.

A second ply of web material V3 is fed into the nip between the embossing roller 23 and the laminating roller 27. In this nip the ply V3 is glued against the embossed ply V1, on the protrusions or protuberances of which produced by the protuberances 23P of the embossing roller 23 a glue has been applied by means of a gluing unit 30.

The ply V3 can also advantageously be pre-embossed by means of an embossing roller 41 provided with protrusions 41P and cooperating with a pressure roller 43 coated in a yielding material such as rubber or plastic.

The configurations of these embossing-laminating units illustrated by way of examples are described in greater detail in WO-A-99/41064 and WO-A-99/44814, which should be referred to for greater details.

The embossing rollers 3, 5, 23 and optionally also the embossing rollers 31 and 41 can be produced according to the invention, with a central core over which interchangeable sleeves with different embossing designs, i.e. variable arrangements of protrusions or protuberances, can be alternatively placed and constrained.

The interchangeable sleeve, produced as will be described in greater detail hereunder, can be constrained on the central core of the roller by a known system, for example of the type described in WO-A-03045680, WO-A-03045679, or by other systems known or within the capacity of one skilled in the art. In general, it is possible to use any device which allows reciprocal clamping of a core with a conical surface and a sleeve with a conical inner surface the same as that of the core, so that the two components can be made for form one piece through reciprocal axial constraint.

Figure 3:
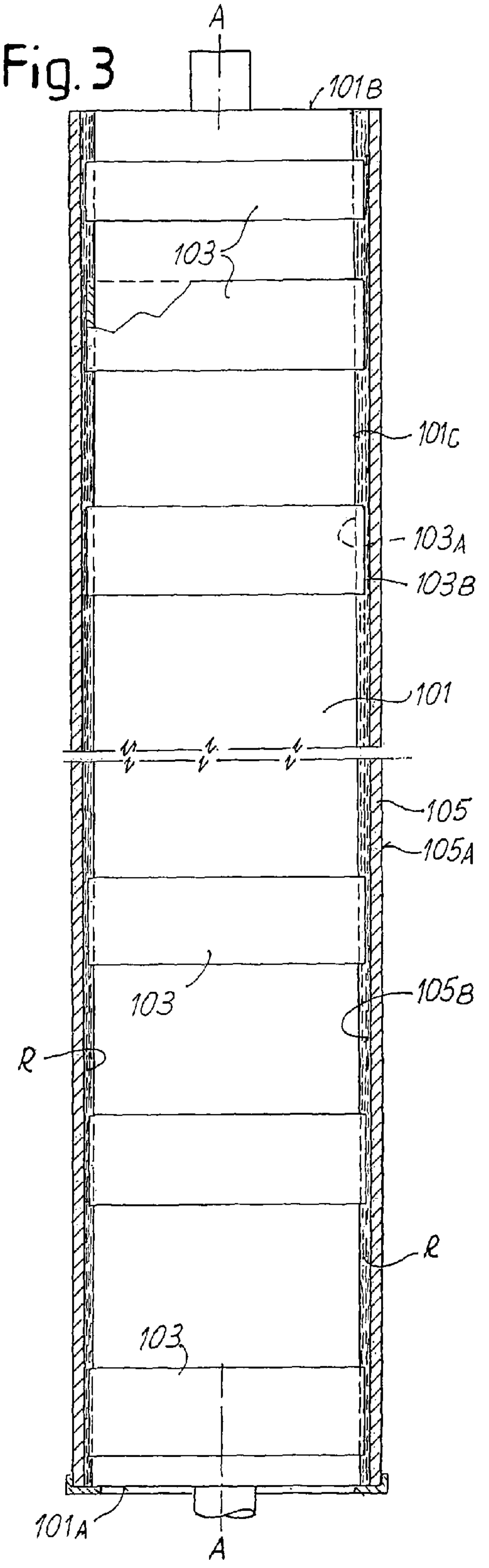
FIG. 3 shows a longitudinal section of a sleeve connected to a core in a step of the construction procedure, according to a first embodiment.

FIG. 3 schematically shows an intermediate production step of the interchangeable sleeve according to the invention.

Conical rings 103 are placed over a central core or axle. The number of conical rings can vary and differ from the number represented in the example described herein (where seven conical rings are used). The various rings can vary in axial extension and, moreover, all have a conical inner surface 103A with minimum and maximum diameters differing from ring to ring, so that each ring is inserted by a different degree on the core 101, the end of which with the larger diameter is indicated with 101A and is in the bottom position, while the opposite end with the smaller diameter indicated with 101B is positioned at the top end. The core 101 is held in this position with the axis A-A vertical in a known way.

In substance, the ring 103 in the lowest position, i.e. nearest to the end 101A of the core 101 is the one with the largest base diameters, while the ring 103 which is nearest to the end 101B is the one with the smallest base diameters.

Distribution of the rings 103 along the axial extension of the central core 101 can be even or uneven, as in the case shown.

Each of the rings 103 has an outer surface 103B substantially cylindrical in shape, and preferably with the same diameter for all the rings.

An external jacket 105 forming the main body of the interchangeable sleeve is placed around the assembly formed of the rings placed over and connected to the core 101. This jacket is centered with respect to the axis A-A so that the outer surface thereof, substantially cylindrical, is coaxial with the core 101. Coaxiality between the core 101 and the outer jacket 105 can be obtained and maintained in a known way, for example with means of the type described in WO-A-03045680. The outer surface 105A of the jacket 105 is provided with embossing protuberances. This surface can be cylindrical or slightly rounded according to need and to the specific requirements of use.

The inner surface 105B of the sleeve 105 is substantially cylindrical and has a larger diameter than the diameter of the outer cylindrical surfaces 103B of the rings 103, so that a space remains between the rings and the inner surface 105B for the objects explained hereunder.

Once the core 101, the rings 103 and the outer jacket 105 have been assembled, a hardening resin, such as a bi-component resin, is poured from above into the empty space between the inner surface 105B of the jacket 105 and the conical surface 101C of the core 101. This resin fills the entire available volume between adjacent rings 103 and between rings and jacket 105.

By allowing the resin to harden, a hardened layer is obtained forming a conical surface, combined with the conical surface 101C of the core 101, without interruption with the conical inner surfaces 103A of the various rings 103.

Figure 4:
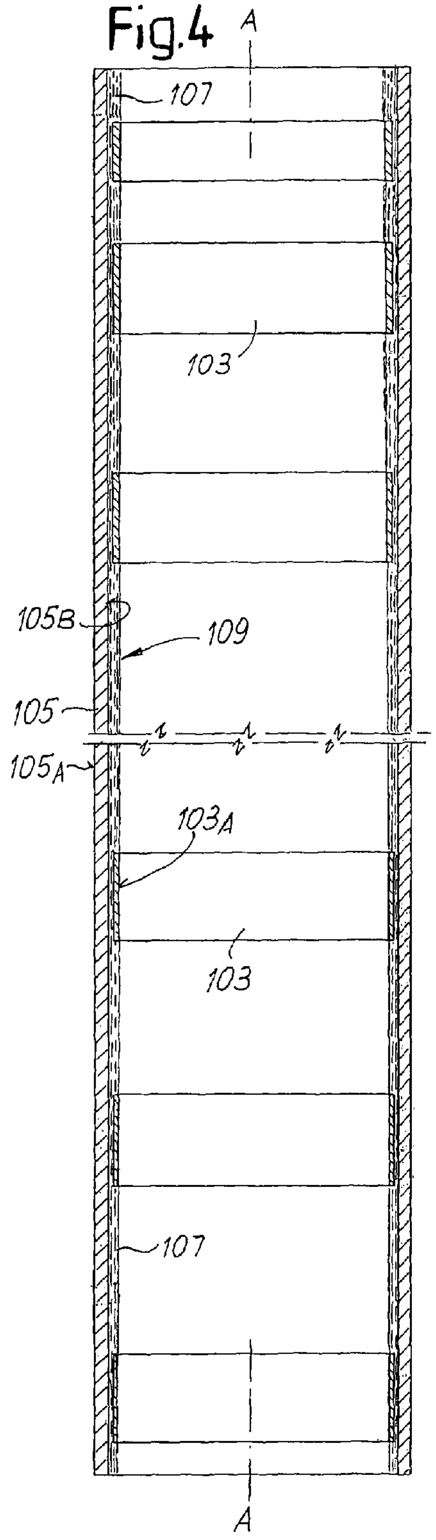
FIG. 4 shows a longitudinal section of a sleeve constructed according to the invention.

After the resin has hardened, the sleeve formed by the jacket 105, by the rings 103 and by the layer of hardened resin is removed from the core 101. The structure of the sleeve obtained is represented in FIG. 4, where the hardened resin is indicated with 107 and the sleeve as a whole is indicated with 109. As. can be seen in FIG. 4, the inner surface of the sleeve is theoretically a continuous conical surface of the same shape as the conical surface of the core 101, which corresponds to the surface of the core of the embossing roller to which the sleeve is connected to form the complete roller, or which can itself form the core of the roller.

In actual fact, a certain degree of localized shrinkage of the resin 107 can occur, so that the inner surface of the core is not perfectly conical. Nonetheless, this does not influence the accuracy and reliability of connection between the sleeve and the core of the roller, as a result of the conical rings 103 embedded in the resin and forming an integral part of the interchangeable sleeve.

These conical surface 103A of the rings 103 can be machined with extremely high precision on the lathe as a result of the reduced axial dimension of the rings. In substance, use of the rings 103 allows machining along reduced axial dimensions (and therefore with narrow tolerances and high precision) of various portions of what will finally become the conical inner surface of a member of considerable axial length composed of the sleeve 109. Besides the high precision which is obtained in processing the conical inner surfaces 103A of the rollers 103, an inner surface of the interchangeable sleeve 109 which is stable through time is obtained with the procedure described, i.e. not subject to deformations of various nature, both deriving from mechanical stress or deriving from dimensional instability (also due to thermal phenomena) of the resin. At least the portions of conical inner surface formed by the inner surface 103A of the rings 103 remain stable through time and this is sufficient to guarantee correct interlocking connection between the central core of the roller and the interchangeable sleeve.

The sleeve thus obtained can undergo various types of processing. It must be understood that the sleeve could be engraved on the outer surface 105A thereof before being inserted on the core 101. Nonetheless, this is preferably constructed first by assembly of the jacket 105 and of the inner rings 103. Subsequently, still maintaining the sleeve thus formed on the central core, it is ground and engraved. This guarantees maximum precision in mechanical surface processing and consequently the coaxiality.

FIGS. 5 and 6 show a different embodiment of the invention. The same numbers indicate the same or equivalent parts to those in the previous figures. The core, indicated again with 101, is provided with a truncated cone shaped surface, with larger and smaller bases 101A, 101B as described hereinbefore.

According to this different embodiment, in a first step of the procedure to construct the interchangeable sleeve 109 around the core 101, a layer of carbon fiber is produced. This layer can be produced with a substantially known technique by helically winding continuous carbon filaments or fibers around the axis A-A of the core 101 until reaching the thickness desired of a component 102 which will form the substantially rigid inner part of the interchangeable sleeve and will define the conical inner surface thereof. The carbon fibers or filaments are impregnated with hardening resin, which once hardened will form a single block with the carbon filaments, to provide the component 102 with a high degree of rigidity.

The shape of the outer surface of the component 102 is not binding, in the sense that it can be conical, with the same or different taper as the taper of the inner surface formed in contact with the core 101, or it can also have a different shape, for example cylindrical.

What is important is that between the outer surface of the component 102 thus formed and the inner surface of a jacket 105 which is placed coaxially around the core 101 sufficient space remains to pour a fluid hardening resin R, which once hardened will form the joining layer between the outer jacket 105, optionally provided with protuberances 105P (FIG. 6A) and the inner component 102.

This resin is applied in a subsequent processing step, represented schematically in FIG. 6, with substantially the same method as that described with reference to the previous figures. Between forming of the carbon fiber layer 102 and pouring of the resin R to form the joining layer 107 sufficient time can lapse to allow hardening of the resin which impregnates the carbon filaments, optionally with the aid of suitable techniques, known, to accelerate hardening.

It is understood that the drawing only shows a possible embodiment of the invention, which can vary in forms and arrangements without however departing from the scope of the concept on which the invention is based.

The invention claimed is:

1. An interchangeable sleeve for a roller for processing a web material comprising:

a jacket having a substantially cylindrical outer surface;

a layer of hardened resin inside said jacket;

a substantially conical inner surface, for connection to a central conical core of the roller;

wherein said inner surface is formed at least in part of a plurality of rings forming an inner component having a rigidity greater than a rigidity of said hardened resin, said rings being constrained to said jacket by said hardened resin; wherein said rings are aligned axially along said sleeve and each of said rings has a conical inner surface, said rings being clamped to said jacket forming the outer surface of the sleeve and being spaced apart along a longitudinal axis of said sleeve; and wherein a portion of said conical surface formed directly of said hardened resin is provided between consecutive rings, said portion of said conical surface being flush with the conical surface of said rings.

2. Interchangeable sleeve as claimed in claim 1, wherein said rings are metal rings.

3. Sleeve as claimed in claim 1, wherein a volume filled with said resin is provided between said rings and the inner surface of said jacket, to clamp said rings to said jacket.

4. Sleeve as claimed in claim 2, wherein a volume filled with said resin is provided between said rings and the inner surface of said jacket, to clamp said rings to said jacket.

5. Sleeve as claimed in claim 1, wherein said layer of hardened resin, in which said rings are embedded, is provided on the inside of the jacket, the conical inner surface of the sleeve being partly formed of the resin and partly formed of the conical inner surface of said rings.

6. Sleeve as claimed in claim 1, including an outer surface provided with embossing protuberances.

7. A roller comprising a central core with a conical outer surface and an interchangeable sleeve as claimed in claim 1.

8. An embossing unit comprising at least one roller as claimed in claim 7.

* * * * *